US006959077B1

(12) United States Patent
Calhoun et al.

(10) Patent No.: US 6,959,077 B1
(45) Date of Patent: Oct. 25, 2005

(54) SYSTEM AND METHOD FOR RE-ROUTING INCOMING CALLS

(75) Inventors: Jeffry Calhoun, Locust Grove, GA (US); Wayland S. Williams, Stone Mountain, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 428 days.

(21) Appl. No.: 09/888,752

(22) Filed: Jun. 25, 2001

(51) Int. Cl.$^7$ ............................................. H04M 7/00

(52) U.S. Cl. ........................... 379/221.03; 379/221.01; 379/212.01

(58) Field of Search ...................... 379/213.01, 212.01, 379/279, 221.03, 221.01

(56) References Cited

U.S. PATENT DOCUMENTS

| | | | | |
|---|---|---|---|---|
| 5,222,128 A | * | 6/1993 | Daly et al. | 379/221.04 |
| 5,259,026 A | * | 11/1993 | Johnson | 379/216.01 |
| 5,644,625 A | * | 7/1997 | Solot | 379/88.22 |
| 5,740,237 A | | 4/1998 | Malik et al. | |
| 5,987,110 A | | 11/1999 | Malik et al. | |
| 6,337,902 B1 | * | 1/2002 | Weik et al. | 379/114.28 |

OTHER PUBLICATIONS

"BellSouth CrisisLink Service," printed from http://www.bellsouth.com/business/products_services/voice_crisislink.html on Apr. 23, 2001.

* cited by examiner

Primary Examiner—Ahmad F. Matar
Assistant Examiner—Rasha S. Al-Aubaidi
(74) Attorney, Agent, or Firm—Withers & Keys, LLC

(57) ABSTRACT

A system and method for routing a communication directed to a directory number. According to one embodiment, wherein a redirection service is operative with respect to the communication directed to the directory number to direct the communication away from the directory number to at least one other directory number whenever the directory number to which the communication was directed is inoperative. The system comprises a switch configured to receive the communication in a switched telephone network, wherein the communication is directed to the directory number having the directory service, and wherein the switch is configured to detect the inoperative directory number associated with the communication; and a service control point in communication with the switch, wherein the switch is configured to provide the directory number to the service control point, and wherein the service control point includes a database of subscriber information maintained by the network, and wherein the service control point is configured to search the database of subscriber information for a matching entry to the inoperative directory number, and wherein the service control point is configured to instruct the switch to redirect the communication away from the directory number to at least one other directory number upon finding the matching entry.

24 Claims, 2 Drawing Sheets

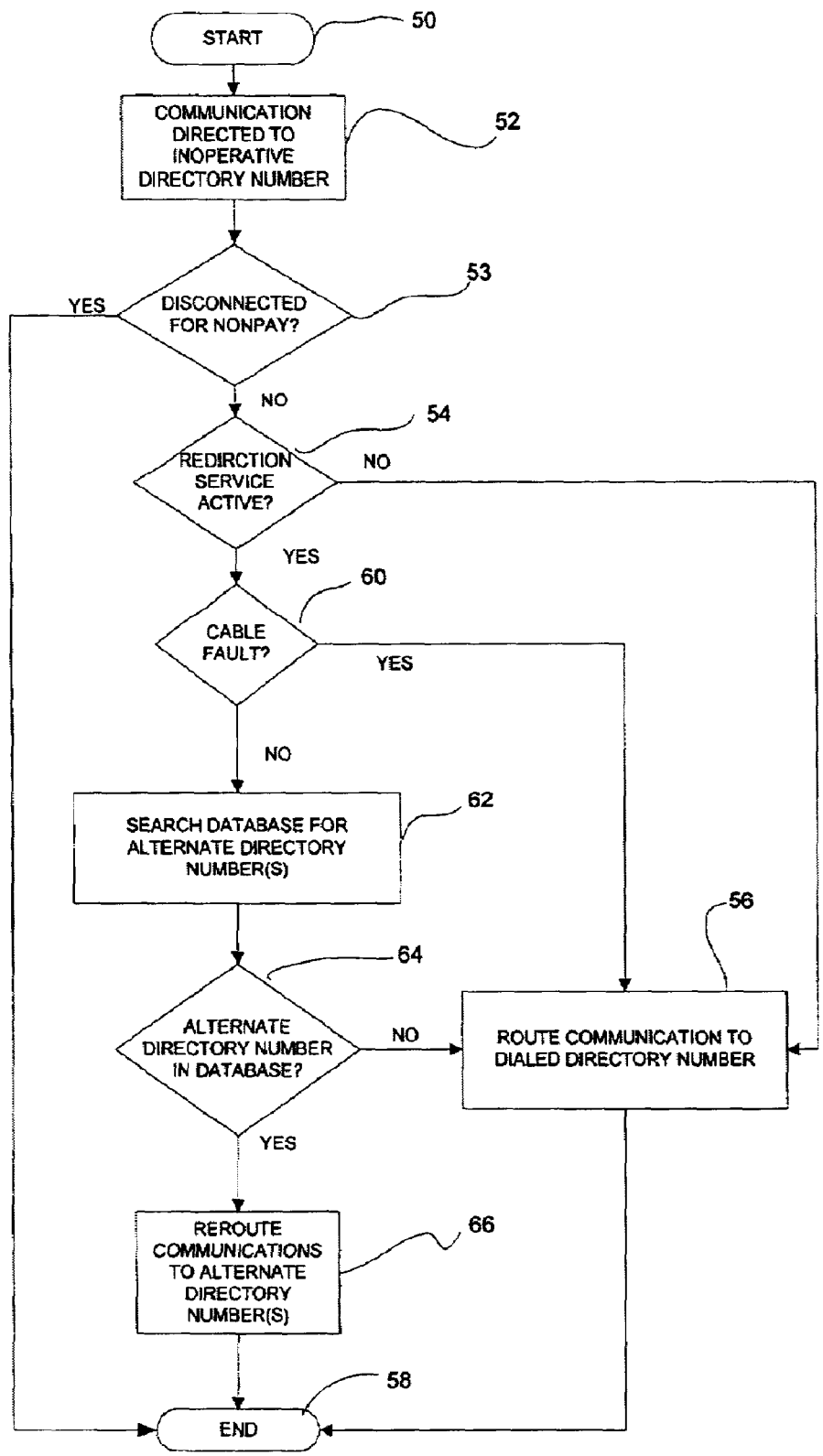

SYSTEM AND METHOD FOR RE-ROUTING INCOMING CALLS

BACKGROUND OF THE INVENTION

1. Field of Invention

The present invention relates generally to telecommunications services and, more particularly, to a system and method for automatically redirecting a communication from a dialed directory number to a pre-selected alternate number or numbers, in the event of a service disruption, to provide backup or disaster recovery for subscribers of voice and data communications.

2. Description of the Background

A telephone network is an integral part of the daily operations for nearly all residences and business establishments. For businesses, in particular, a service disruption can be devastating, impacting earnings and even market valuation. The impact of a service disruption on an organization ranges from a minor inconvenience to an inability to perform necessary business tasks with resulting loss of productivity, revenue, and even customers and market share. Service disruptions may stem from a variety of events including, for example, improper digging, mistakes in locating cables, or severe weather. Fortunately, service disruptions are relatively rare. Nevertheless, a prudent network administrator will structure the network to minimize downtime when disruptions do occur.

To protect against such losses, small businesses, and even people who work at home, often use call-forwarding or redirection services. One redirection service is the CRISISLINK® service offered by BellSouth Telecommunications, Inc., Atlanta, Ga. The CRISISLINK® service is a network-based service that allows a subscriber to redirect all calls or a selectable percentage of calls during an emergency or during specified times from primary telephone numbers to one or more alternate ("backup") numbers previously selected by the subscriber. Even with call redirection services like CRISISLINK®, subscribers must contact the service provider to activate the call redirection plan when a problem occurs.

A need exists for a system that minimizes system downtime in the event of an interruption of service. Such a recovery system should be free of any subscriber intervention, thereby minimizing downtime.

SUMMARY OF THE INVENTION

The present invention is directed to a system and method for routing a communication directed to a directory number. According to one embodiment, wherein a redirection service is operative with respect to the communication directed to the directory number to direct the communication away from the directory number to at least one other directory number whenever the directory number to which the communication was directed is inoperative. The system comprises a switch configured to receive the communication in a switched telephone network, wherein the communication is directed to the directory number having the directory service, and wherein the switch is configured to detect the inoperative directory number associated with the communication; and a service control point in communication with the switch, wherein the switch is configured to provide the directory number to the service control point, and wherein the service control point includes a database of subscriber information maintained by the network, and wherein the service control point is configured to search the database of subscriber information for a matching entry to the inoperative directory number, and wherein the service control point is configured to instruct the switch to redirect the communication away from the directory number to at least one other directory number upon finding the matching entry.

The system and method of the present invention may be used, for example, to automatically redirect a communication from a dialed directory number to a pre-selected alternate number or numbers. For example, the present invention may be used in the provision of voice and data communications services in which the dialed directory number is subject to a service disruption. To minimize network downtime, the system and method of the present invention may be employed without subscriber intervention.

These and other benefits of the present invention will be apparent from the detailed description below.

DESCRIPTION OF THE FIGURES

For the present invention to be understood clearly and readily practiced, the present invention will be described in conjunction with the following figures, wherein:

FIG. 2 is a flow diagram of a system for automatically redirecting a communication from a dialed directory number according to one embodiment of the present invention.

DETAILED DESCRIPTION OF THE INVENTION

Figure 1:
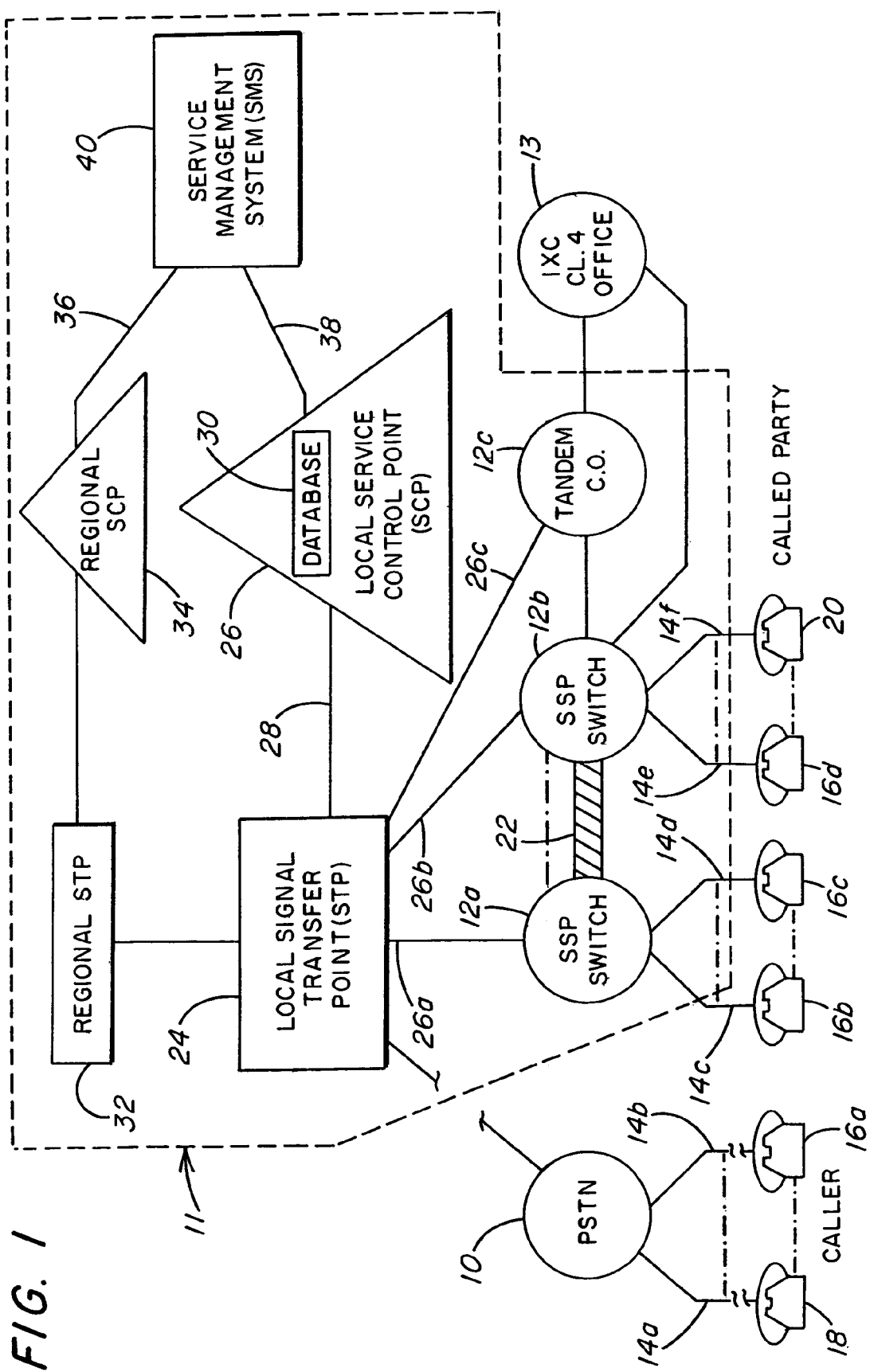
FIG. 1 is a block diagram illustrating a public switched telephone network.

It is to be understood that the figures and descriptions of the present invention have been simplified to illustrate elements that are relevant for a clear understanding of the present invention while eliminating, for purposes of clarity, other elements. For example, certain operating system details and modules of certain intelligent platforms are not described herein. Those of ordinary skill in the art will recognize, however, that these and other elements may be desirable in a typical communications network. A discussion of such elements is not provided because such elements are well known in the art and because they do not facilitate a better understanding of the present invention.

FIG. 1 is a block diagram illustrating a public switched telephone network (PSTN) 10 and an illustrative portion 11 of the PSTN. In particular, the portion 11 of the PSTN illustrates a part of the Advanced Intelligent Network (AIN) of a typical local exchange carrier according to one embodiment of the present invention. The AIN comprises a plurality of central offices, which are indicated as SSP switches 12a, 12b in FIG. 1. "SSP" is an acronym for service switching point. A service switching point is a switch, (specifically a Class 5 central office) and the terms are used interchangeably herein.

According to one embodiment, the service switching point is equipped with AIN software. The dashed lines between the switches 12a, 12b indicate that the number of switches is arbitrary. The AIN also comprises non-SSP central office switches, but such non-SSP switches are not shown in FIG. 1. The difference between an SSP and a non-SSP switch is that an SSP includes intelligent network functionality including appropriate hardware and software so that, when a set of predetermined conditions are detected, the SSP initiates a trigger for a predetermined state of a call on a subscriber's directory number, generates the trigger as an appropriate message to be sent out over the network, and suspends handling of a call until the SSP receives a reply from the network instructing the SSP to take certain action. If the SSP receives no instructions within a certain amount of time, the SSP has a default task to execute with respect to the predetermined condition. A non-SSP switch is an electronic switch that can generate certain rudimentary data packets and provide them over the network, but the non-SSP switch must rely on other equipment to provide subscriber lines connected to such a non-SSP switch with more complex features and services available in the AIN.

As is well known to those skilled in the art, the AIN also includes a tandem switch (also referred to as a "tandem central office") that interconnects local offices, SSPs, and interexchange carriers (IXCs). In particular, if an interoffice trunk or an IXC trunk to an SSP becomes unavailable or overloaded, an alternate routing plan can go into effect so that calls are processed through the tandem attempting to reach the SSP. As alternate routing paths, the tandem switches include the same equipment and are provided with the same information available to their respective SSPs. In the case of a problem with accessing a particular SSP, the SSP's alternate route through the tandem may be taken until the problem is resolved. FIG. 1 illustrates the tandem switch 12c, associated with SSP 12b and with IXC 13 (which is a Class 4 office), which will be well known to those skilled in the art.

As further illustrated in FIG. 1, SSP switches 12a, 12b have a plurality of subscriber lines commonly designated as 14 (14a, 14b, 14c, and 14d, 14e, and 14f) connected thereto. Typically, the number of subscriber lines serviced by each switch is on the order of 10,000 to 70,000 lines. Each subscriber line 14 is connected to a piece of terminating equipment including a plurality of telephones commonly designated as 16 (16a, 16b, 16c and 16d). Although telephones are illustrated as the pieces of terminating equipment in FIG. 1, those skilled in the art will understand that such pieces include other telecommunication devices such as facsimile machines, computers, modems, etc. In particular, the telephones 16a, 18 are shown as connected by broken subscriber lines 14a, 14b to PSTN 10 to indicate that these subscriber lines and pieces of terminating equipment represent lines and equipment that exist in a conventional manner within the network and that operate with the present invention, but that are not necessarily connected to SSPs 12a, 12b. In addition, one of the illustrated telephones 18 is designated as corresponding to the calling party, (also referred to as "caller" or as "source"). Another of the illustrated telephones 20 is designated as corresponding to the called party. Both of these designations will become useful in the description of the embodiments as set forth below. By way of example, FIG. 1 illustrates that the telephone of calling party 18 is connected via subscriber line 14a to PSTN 10, and the telephone of called party 20 is connected via subscriber line 14f to SSP 12b.

According to one embodiment of the present invention, each piece of terminating equipment in an intelligent switched network is assigned a ten-digit directory number. In the description of the present invention, the term "directory number" is used in its generally understood meaning to be the number which is dialed or input by a caller or source to reach a piece of terminating equipment associated with the dialed directory number. A directory number is commonly referred to as a telephone number. It should be noted that the directory number associated with a piece of terminating equipment is not necessarily unique, but may be shared by a group of pieces of terminating equipment. For example, a household may include several different telephones, a facsimile machine, and a computer with a modem. It is likely that the several telephones in the home will all be assigned the same directory number so that a call that terminates at the home may be conveniently answered at any of the telephones in the home. It is likely, however, that the facsimile machine and the computer will each have a different directory number from the directory number assigned to the home telephones. These numbers may be different because the telecommunication services provided to the facsimile machine and to the computer may be billed differently from the telephones, or be serviced differently from the telephones, or may be set up so that their use does not interfere with the telephones.

Referring again to FIG. 1, switches 12a, 12b are interconnected by a plurality of trunk circuits indicated as 22 in FIG. 1. These are the voice path trunks that interconnect the central office switches to connect communications. The term "communication" is used herein to include all messages or calls that may be exchanged between the caller and the called party in the network illustrated in FIG. 1. It should be understood that central office trunking in a typical urban environment is not limited to a daisy chain arrangement implied by FIG. 1. In other words, in a typical network, trunk circuits exist between central office switch 12a or 12b and the central office switch(es) (not shown) servicing the pieces of terminating equipment 16a, 18.

Each of the SSPs in the network including switches 12a, 12b and tandem 12c is connected to a local signal transfer point (STP) 24 via respective data links 26a, 26b and 26c. These data links may employ a signaling protocol referred to as Signaling System 7 (SS7), which is well known to those skilled in the art. STP 24 is simply a multi-port high-speed packet switch that is programmed to respond to the routing information in the SS7 protocol, and route the packet to its destination. STPs are conventionally installed in redundant pairs (like the tandem central offices) with accompanying data links. The redundant devices are not illustrated for the sake of simplicity in the drawings.

Much of the intelligence of the AIN resides in the local service control point (SCP) 26 that is connected to STP 24 over SS7 data link 28. As is known to those skilled in the art, SCPs are physically implemented by relatively powerful fault tolerant computers. SCPs may be provided in redundant pairs. Among the functions performed by SCPs is the maintenance of network databases that are used in providing services. In addition, SCPs include databases such as the illustrated subscriber information database 30 that identify particular service subscribers and the services to be accorded to these subscribers.

In order to keep the processing of data and calls as simple as possible, a relatively small set of triggers is defined at the switches for each call. A trigger in the AIN is an event associated with a particular subscriber line that generates a packet to be sent to an SCP. The trigger causes the SCP to query its database to determine which customized calling feature or enhanced service should be implemented for a particular call. The results of the database inquiry are sent back to the switch from SCP 26 through STP 24. The return packet includes instructions to the switch as to how to process the call. The instruction may be to take some special action as a result of a customized calling service or enhanced feature. In response to receiving the latter type message, the switch moves through its call states, collects the called digits, and generates further packets that are used to set up and route the call. Regional STP 32 and regional SCP 34 provide similar devices for routing calls among various local exchange carriers.

Both regional SCP 34 and local SCP 26 are connected via respective data links 36 and 38 to a service management system (SMS) 40. The SMS 40 also is implemented by a large general purpose computer and interfaces to business offices of the local exchange carrier and interexchange carriers. The SMS downloads information to the databases of SCPs 30 and 34 when subscribers set up or modify their ensemble of AIN services. Similarly, SMS 40 downloads, on a non-realtime basis, billing information that is needed in order to appropriately invoice subscribers for the services provided.

The present invention operates in the above-described environment as illustrated in FIG. 1 to automatically redirect network communications to a preselected directory number in the event of a service disruption. To provide a detailed explanation, it will be understood that a subscriber has subscribed to the redirection service of the present invention. Pursuant to this service, in the event of a service disruption, all communications directed to a particular previously selected directory number (or numbers) will be handled pursuant to a redirection scheme or plan preselected by the subscriber.

The call is directed to the directory number (or one of them if there is more than one) to which redirection services would generally be applied in the relevant situations. The communication is directed through use of the directory number (also referred to as a "called party number" or "dialed directory number") such as a telephone number entered by the subscriber (henceforth referred to as the calling party 18) and associated with the communication in a manner well known to those of ordinary skill in the art. According to one embodiment, the call is received at a service switching point. According to such an embodiment, the communication is routed from the receiving SSP through the AIN on the basis of the directory number until the communication reaches a service switching point 12b, which serves communications directed to that directory number.

According to one embodiment of the present invention, the service switching point that serves the "dialed" directory number tests for cable faults in feeder cable between the serving central office and the customer premises, or to the last point of cable sheath. The presence of a cable fault in the feeder cable associated with the dialed directory number invokes a query, in a conventional manner, causing the service switching point to check with its associated service control point for instructions. For example, as illustrated in FIG. 1, if calling party 18 initiates a communication directed to the directory number associated with called party 20, the communication will reach service switching point 12b, which then tests for cable faults between the serving central office and the customer premises. If the test proves that a cable pair is open (i.e., the cable run lacks continuity from start to finish), the service switching point 12b provides the service control point 26 with the directory number associated with the called party.

Service control point 26 maintains a list of directory numbers having special services. According to one embodiment, the service control point 26 comprises subscriber records (or subscriber information) database 30 including entries of directory numbers (also referred to as "directory number subscriptions") associated with called party lines accorded special treatment such as redirection services. Generally, service control point 26 compares the directory number received from switching point 12b with entries in the database 30 in order to determine whether the communication is to receive special services. In particular, the service control point 26 identifies the directory number associated with the communication. The service control point 26 compares this directory number with entries in the database 30 in order to determine whether the directory number has a valid subscription for special services.

If a matching entry for special services is not found, the service switching point 12b provides the communication with default treatment by routing the communication without special services. If a matching entry for special services is found, the service control point 26 then traverses the service logic and the subscriber's preselected redirection scheme is applied to the communication, i.e., the redirection service is activated with respect to the communication. The service control point 26 provides the service switching point 12b with the appropriate instructions to route the communication pursuant to the subscriber's preselected redirection scheme. The switch 12b responds by routing the communication accordingly. If a corresponding entry is not found, the service switching point 12b provides the communication with default treatment by routing the communication without special services.

If the service control point 26 fails to find a corresponding entry to the dialed directory number then, according to one embodiment, service control point 26 generally determines whether the redirection service for the directory number is active. This step is executed by the service control point 26 in a manner well known to those skilled in the art for checking whether a particular service has been implemented with respect to a particular directory number. If the network communication redirection service has not been implemented, then the service control point 26 provides the switch 12b with conventional routing instructions to route the communication to the directory number. The switch 12b responds to the conventional routing instructions by routing the communication to the dialed directory number.

In the case of a hunt group (i.e., rollover lines) each directory number in the hunt group may have a corresponding alternate dialed directory number. For example, a hunt group comprising three lines, each associated with a unique ten-digit dialed directory number such as 404-555-1111, 404-555-1112, and 404-555-1113, may be associated with three alternate lines. Specifically, the first line, 404-555-1111, may have an alternate directory number of 404-771-5544. Likewise, the second and third lines in the hunt group may have alternate directory numbers such as 404-771-6785 and 404-774-1234, respectively. In event of a cable fault in the second line, a call directed to 404-555-1111 may be rolled over to the second line in the hunt group, 404-555-1112. The present invention can redirect the original call, initially directed to 404-555-1111 and rolled over to 404-555-1112, to the second alternate line 404-771-6785. Because the incoming calls may be directed to different dialed directory numbers, no hunting or rollover is required at the rerouted end.

FIG. 2 further illustrates the service logic described above. FIG. 2 is entered at step 50, and in step 52, the present invention receives a communication from a source directed to an inoperative directory number. The source may be a person or calling party such as the calling party 18 illustrated in FIG. 1, or the source may be a telecommunications device. For illustrative purposes, it will be assumed that the source is the calling party 18. According to one embodiment, the source uses any touch-tone telephone to dial in a directory number to direct the communication. The communication works its way through the network in a manner well known to those skilled in the art until it reaches the network device servicing the dialed directory number. In step 53, the directory number associated with the communication is read in a convention manner, upon which the SSP determines whether the line has been temporarily disconnected for non-payment or other reason unrelated to a cable fault and directs the call accordingly. In step 54, the directory number associated with the communication is read, again in a conventional manner, and checked for special handling instructions. The inclusion and reading of information to trigger special handling of a communication in the AIN is well known to those skilled in the art. In particular, the service switching point checks whether a redirect trigger is present with respect to the dialed directory number such that the communication is subject to redirection services. If there are no special handling instructions associated with the identification information, in step 56 the present invention routes the communication in a conventional manner to the dialed directory number, and proceeds to end in step 58.

If there are special handling instructions associated with the directory number, then in step 60 the SSP conducts a test to determinate whether a cable fault exists. As explained above, the emergency re-route feature is a method and system that applies an automatic redirection service to the dialed directory number so that, in the event the dialed directory number becomes inoperative, the communication may reach an alternate directory number, rather than the dialed directory number. Advantageously, this method and system provides a redirection service with no subscriber involvement, thereby minimizing downtime. If the cable fault determination in step 60 is negative, then in step 56 the present invention routes the communication in a conventional manner to the dialed directory number, and proceeds to end in step 58. If the cable fault determination in step 60 is positive, then in step 62 the present invention checks whether the dialed directory number matches information maintained by the network that indicates that the directory number has an active emergency re-route service according to the present invention. If the directory number matches a directory number in the database 30, then in step 64 the present invention determines whether the database 30 contains an alternate directory number associated with the dialed directory number. If not, then step 56 of the present invention routes the communication in a conventional manner to the dialed directory number, and proceeds to end in step 58. Otherwise, in step 66 the present invention routes the communication to the alternate directory number associated with the emergency re-route service. The system and method of the present invention, therefore, allows for automatic deactivation of the redirection service when the dialed directory number returns to operation.

It should be understood that the invention is not limited by the foregoing description, but embraces all such alterations, modifications, and variations in accordance with the spirit and scope of the appended claims.

What is claimed is:

1. A system for routing communications directed to a directory number corresponding to a first subscriber line, wherein a redirection service is operative with respect to the communications directed to the directory number to automatically direct the communications away from the directory number, without intervention by a calling party, to at least one other directory number corresponding to a second subscriber line whenever the directory number to which the communications are directed is temporarily inoperative due to a temporary service disruption, the system comprising:
   a switch configured to receive each of the communications in a communication network, wherein each of the communications are directed to the temporarily inoperative directory number having the redirection service, and wherein for each communication the switch is configured to detect whether the temporarily inoperative directory number associated with a current one of the communications is inoperative and is further configured to complete the current communication to the temporarily inoperative directory number corresponding to the first subscriber line when the temporarily inoperative directory number is operative for the current communication and to redirect the current communication to the at least one other directory number corresponding to the second subscriber line when instructed to do so; and
   a controller, in communication with the switch, wherein the switch is configured to provide an indication that the temporarily inoperative directory number is inoperative to the controller upon detecting that the temporarily inoperative directory number is inoperative for the current communication, and wherein the controller includes a database of subscriber information maintained by the network, and wherein the controller is configured to search the database of subscriber information for a matching entry to the temporarily inoperative directory number in response to receiving the indication, and wherein the controller is configured to instruct the switch to redirect the current communication away from the temporarily inoperative directory number to the at least one other directory number upon finding the matching entry, and wherein the controller is configured to retain the temporarily inoperative directory number in the database for routing a subsequent one of the communications thereto after the temporary service disruption has been resolved.

2. The system of claim 1, wherein the switch is configured to detect the temporarily inoperative directory number by testing for a cable fault.

3. The system of claim 2, wherein the switch is configured to test for the cable fault in a feeder cable.

4. The system of claim 3, wherein the database of subscriber information includes one or more alternate directory numbers pursuant to a preselected redirection scheme.

5. The system of claim 4, wherein the switch routes the communication to the temporarily inoperative directory number to which the communication was directed when no corresponding entry is found in the database.

6. The system of claim 5, further comprising:
   a service management system, in communication with the controller, for downloading subscriber information to the database.

7. A method for routing communications directed to a directory number corresponding to a first subscriber line, wherein a redirection service is operative with respect to the communications directed to the directory number to automatically direct the communications away from the directory number, without intervention by a calling party, to at least one other directory number corresponding to a second subscriber line whenever the directory number to which the communications are directed is temporarily inoperative due to a temporary service disruption, the method comprising:
   configuring a switch to receive each of the communications in a switched telephone network, wherein each of the communications is directed to the temporarily inoperative directory number having the redirection service;
   configuring the switch to detect for each of the communications the temporarily inoperative directory number corresponding to the first subscriber line associated with the communication;

connecting a service control point to the switch;
configuring the switch to provide the temporarily inoperative directory number to the service control point and to redirect a current one of the communications to the at least one other directory number corresponding to the second subscriber line once instructed to do so when the switch detects that the temporarily inoperative directory number is inoperative for the current communication and to complete the current communication to the temporarily inoperative directory number when the switch detects that the temporarily inoperative directory number is operative;
maintaining a database of subscriber information;
configuring the service control point to search the database of subscriber information for a matching entry to the temporarily inoperative directory number; and
configuring the service control point to:
instruct the switch to redirect the current communication away from the temporarily inoperative directory number to the at least one other directory number upon finding the matching entry, and
retain the temporarily inoperative directory number for routing a subsequent one of the communications thereto after the service disruption has been resolved.

8. The method of claim 7, wherein configuring the switch to detect the temporarily inoperative directory number includes:
testing for a cable fault.

9. The method of claim 8, wherein configuring the switch to detect the temporarily inoperative directory number includes:
testing for cable fault in a feeder cable.

10. The method of claim 9, wherein maintaining a database includes:
maintaining one or more alternate directory numbers pursuant to a preselected redirection scheme.

11. The method of claim 10, further comprising:
routing the communication to the temporarily inoperative directory number to which the communication was directed when no corresponding entry is found in the database.

12. The method of claim 11, wherein maintaining the database includes:
downloading subscriber information to the database.

13. A system for routing communications directed to a directory number corresponding to a first subscriber line, wherein a redirection service is operative with respect to the communications directed to the directory number to automatically direct the communications away from the directory number, without intervention by a calling party, to at least one other directory number corresponding to a second subscriber line whenever the directory number to which the communications are directed is temporarily inoperative due to a temporary service disruption, the method comprising:
means for configuring a switch to receive each of the communications in a switched telephone network, wherein each of the communications is directed to the temporarily inoperative directory number corresponding to the first subscriber line having the redirection service;
means for configuring the switch to detect for each communication whether the temporarily inoperative directory number associated with a current one of the communications is inoperative;
means for connecting a service control point to the switch;
means for configuring the switch to provide the temporarily inoperative directory number to the service control point when the switch detects that the temporarily inoperative directory number is inoperative for the current communication, to complete the current communication to the at least one other directory number corresponding to the second subscriber line when instructed to do so, and to complete the current communication to the temporarily inoperative directory number when the switch detects that the temporarily inoperative directory number is operative;
means for maintaining a database of subscriber information;
means for configuring the service control point to search the database of subscriber information for a matching entry to the temporarily inoperative directory number received from the switch;
means for configuring the service control point to instruct the switch to redirect the current communication away from the temporarily inoperative directory number to the at least one other directory number upon finding the matching entry, and
means for configuring the service control point to retain the temporarily inoperative directory number for routing a subsequent one of the communications thereto after the service disruption has been resolved.

14. The method of claim 13, wherein configuring the switch to detect the temporarily inoperative directory number includes:
means for testing for a cable fault.

15. The system of claim 14, wherein configuring the switch to detect the temporarily inoperative directory number includes:
means for testing for cable fault in a feeder cable.

16. The method of claim 15, wherein maintaining a database includes:
maintaining one or more alternate directory numbers pursuant to a preselected redirection scheme.

17. The system of claim 16, further comprising:
means for routing the communication to the temporarily inoperative directory number to which the communication was directed when no corresponding entry is found in the database.

18. The system of claim 17, wherein maintaining the database includes:
means for downloading subscriber information to the database.

19. A computer-readable medium having stored thereon instructions which, when executed by a processor, cause the processor to perform the steps of:
configuring a switch to receive communications in a switched telephone network, wherein the communications are directed to a directory number corresponding to a first subscriber line having a directory service, wherein the directory service is a redirection service that is operative with respect to the communications directed to the directory number and automatically directs the communications away from the directory number, without intervention by a calling party, to at least one other directory number corresponding to a second subscriber line whenever the directory number to which the communications are directed is temporarily inoperative due to a temporary service disruption;
configuring the switch to detect for each communication whether the temporarily inoperative directory number associated with a current one of the communications is inoperative, to complete the current communication to the at least one other directory number when instructed to do so, and to complete the current communication to the temporarily inoperative directory number when the switch detects that the temporarily inoperative directory number is operative;

connecting a service control point to the switch;

configuring the switch to provide the temporarily inoperative directory number to the service control point when the switch detects that the temporarily inoperative directory number is inoperative;

maintaining a database of subscriber information at the service control point;

configuring the service control point to search the database of subscriber information for a matching entry to the temporarily inoperative directory number; and configuring the service control point to instruct the switch to redirect the current communication away from the temporarily inoperative directory number to the at least one other directory number upon finding the matching entry; and configuring the service control point to retain the temporarily inoperative directory number for routing a subsequent one of the communications thereto after the service disruption has been resolved.

20. The medium of claim 19, wherein configuring the switch to detect the temporarily inoperative directory number includes:

testing for a cable fault.

21. The medium of claim 20, wherein configuring the switch to detect the temporarily inoperative number directory includes:

testing for cable fault in a feeder cable.

22. The medium of claim 21, wherein maintaining a database includes:

maintaining one or more alternate directory numbers pursuant to a preselected redirection scheme.

23. The medium of claim 22, further comprising:

routing the communication to the temporarily inoperative directory number to which the communication was directed when no corresponding entry is found in the database.

24. The medium of claim 23, wherein maintaining the database includes:

downloading subscriber information to the database.

\* \* \* \* \*